(12) United States Patent
Ahn et al.

(10) Patent No.: US 8,737,334 B2
(45) Date of Patent: May 27, 2014

(54) METHOD FOR TRANSMITTING A SOUNDING REFERENCE SIGNAL IN AN UPLINK COMP COMMUNICATION SYSTEM, AND APPARATUS FOR SAME

(75) Inventors: Joon Kui Ahn, Anyang-si (KR); Min Gyu Kim, Anyang-si (KR); Byoung Hoon Kim, Anyang-si (KR); Suck Chel Yang, Anyang-si (KR); Bong Hoe Kim, Anyang-si (KR); Dong Youn Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 246 days.

(21) Appl. No.: 13/319,952

(22) PCT Filed: Dec. 7, 2010

(86) PCT No.: PCT/KR2010/008700
§ 371 (c)(1),
(2), (4) Date: Nov. 10, 2011

(87) PCT Pub. No.: WO2011/071291
PCT Pub. Date: Jun. 16, 2011

(65) Prior Publication Data
US 2012/0057516 A1    Mar. 8, 2012

Related U.S. Application Data

(60) Provisional application No. 61/267,377, filed on Dec. 7, 2009, provisional application No. 61/267,413, filed on Dec. 7, 2009.

(51) Int. Cl.
*H04W 72/04* (2009.01)
*H04W 28/04* (2009.01)

(52) U.S. Cl.
CPC ...... *H04W 72/0413* (2013.01); *H04W 72/0406* (2013.01); *H04W 72/04* (2013.01); *H04W 28/04* (2013.01)
USPC ............... 370/329; 455/452.1; 455/422.1; 455/450; 370/312; 370/336

(58) Field of Classification Search
CPC ............ H04W 72/0406; H04W 72/04; H04W 72/0413; H04W 28/04
USPC ............... 370/312, 329, 366; 455/450, 452.1, 455/422.1
See application file for complete search history.

(56) References Cited

U.S. PATENT DOCUMENTS

2011/0098054 A1\* 4/2011 Gorokhov et al. ......... 455/452.1
2011/0176502 A1\* 7/2011 Chung et al. ................. 370/329

(Continued)

OTHER PUBLICATIONS

Alcatel-Lucent et al., "Comparison of CSI Feedback Schemes," 3GPP TSG-RAN WG1 #58, R1-093778, Miyazaki, Japan, Oct. 12-16, 2009, pp. 1-8.
Alcatel-Lucent et al., "UL SRS Enhancements to Support CoMP and Transmit Diversity," 3GPP TSG-RAN WG1 #59, R1-094609, Jeju, Korea, Nov. 9-13, 2009, pp. 1-3.

(Continued)

*Primary Examiner* — Asad Nawaz
*Assistant Examiner* — Najeebuddin Ansari
(74) *Attorney, Agent, or Firm* — Birch, Stewart, Kolasch & Birch, LLP

(57) ABSTRACT

The present invention relates to a method for transmitting a sounding reference signal from a terminal in an uplink coordinative multi-point (CoMP) communication system. Specifically, the method comprises the steps of: receiving parameters for transmitting a sounding reference signal from a serving base station included in a CoMP set; assigning a resource for the sounding reference signal on the basis of the parameters; and transmitting the sounding reference signal to the serving base station included in the CoMP set and to at least one neighboring base station according to the assigned resource, wherein basis sequences of the parameters for the sounding reference signal are different for base stations included in the CoMP set.

4 Claims, 15 Drawing Sheets

(56) References Cited

U.S. PATENT DOCUMENTS

| | | | |
|---|---|---|---|
| 2012/0014349 A1* | 1/2012 | Chung et al. | 370/329 |
| 2012/0113950 A1* | 5/2012 | Skov et al. | 370/329 |
| 2012/0213146 A1* | 8/2012 | Liu et al. | 370/312 |
| 2012/0252474 A1* | 10/2012 | Tiirola et al. | 455/450 |

OTHER PUBLICATIONS

Pantech et al., "Further Consideration on Enhanced SRS for CoMP/non-CoMP User Group," 3GPP TSG RAN1 #59, R1-094964, Jeju, Korea, Nov. 9-13, 2009, pp. 1-4.

Samsung, "SRS Transmission in LTE-A," 3GPP TSG RAN WG1 #59, R1-094576, Jeju, Korea, Nov. 9-13, 2009, pp. 1-3.

* cited by examiner (a) Control-Plane Protocol Stack (b) User-Plane Protocol Stack

METHOD FOR TRANSMITTING A SOUNDING REFERENCE SIGNAL IN AN UPLINK COMP COMMUNICATION SYSTEM, AND APPARATUS FOR SAME

This application is the National Phase of PCT/KR2010/008700 filed on Dec. 7, 2010, which claims priority under 35 U.S.C. 119(e) to U.S. Provisional Application No. 61/267,377 filed on Dec. 7, 2009 and U.S. Provisional Application No. 61/267,413 filed on Dec. 7, 2009. The entire contents of all of the above applications are hereby incorporated by reference.

FIELD OF THE INVENTION

The present invention relates to a wireless communication system. And, more particularly, the present invention relates to a method for transmitting a sounding reference signal in an uplink CoMP communication system, and an apparatus for the same.

BACKGROUND ART

As an example of a communication system to which the present invention may be applied, a 3GPP LTE ($3^{rd}$ Generation Partnership Project Long Term Evolution; hereinafter referred to as "LTE") communication system will now be broadly described.

FIG. 1 illustrates a general view of an E-UMTS network structure as an example of a communication system. Herein, the E-UMTS (Evolved Universal Mobile Telecommunications System) corresponds to a system evolved from the conventional UMTS (Universal Mobile Telecommunications System). The 3GPP is presently carrying out a basic standardization process for the E-UMTS. Generally, the E-UMTS may also be referred to as an LTE system. For details of the technical specifications of the UMTS and the E-UMTS, reference may be made to Release 7 and Release 8 of "3rd Generation Partnership Project; Technical Specification Group Radio Access Network".

Referring to FIG. 1, the E-UMTS includes a User Equipment (UE) (120), base stations (eNode B; eNB) (110a and 110b), and an Access Gateway (AG), which is located at an end of a network (E-UTRAN) and connected to an external network. The base stations can simultaneously transmit multiple data streams for a broadcast service, a multicast service and/or a unicast service.

One or more cells may exist for one base station. One cell is set to one of bandwidths of 1.25, 2.5, 5, 10, and 20 Mhz to provide a downlink or uplink transport service to several user equipments. Different cells may be set to provide different bandwidths. Also, one base station controls data transmission and reception for a plurality of user equipments. The base station transmits Downlink (DL) scheduling information of downlink data to the corresponding user equipment to notify information related to time and frequency domains to which data will be transmitted, encoding, data size, and HARQ (Hybrid Automatic Repeat and reQuest). Also, the base station transmits Uplink (UL) scheduling information of uplink data to the corresponding user equipment to notify information related to time and frequency domains that can be used by the corresponding user equipment, encoding, data size, and HARQ (Hybrid Automatic Repeat and reQuest). An interface for transmitting user traffic or control traffic can be used between the base stations. A Core Network (CN) may include the AG and a network node or the like for user registration of the UE. The AG manages mobility of a UE on a TA (Tracking Area) unit basis, wherein one TA unit includes a plurality of cells.

The wireless communication technology has been developed up to the LTE based upon WCDMA. However, the demands and expectations of the users and the manufacturers and providers are growing continuously. Also, since other wireless access technologies are constantly being developed, the wireless communication technology is required to newly evolve in order to ensure competiveness in the future. Accordingly, characteristics, such as reduced cost for each bit, extended service availability, usage of a flexible frequency band, simple structure and open interface, and adequate power consumption of the user equipment are being requested.

Recently, a standardization procedure for a succeeding (or subsequent) technology of the LTE has been under progress by the 3GPP. In the description of the present invention, the above-mentioned technology will be referred to as "LTE-Advanced" or "LTE-A". The essential difference between the LTE system and the LTE-A system is the system bandwidth. The LTE-A system aims to support a broadband of up to 100 MHz. For this, the LTE-A system encourages the use of a carrier aggregation (or bandwidth aggregation) technology, which achieves a broadband by using multiple component carriers. In order to use a wider (or broader) frequency band, the carrier aggregation (or bandwidth aggregation) uses a plurality of component carriers as a single large logical frequency band. The bandwidth of each frequency block may be defined based upon the bandwidth of a system block used in the LTE system. Each frequency block uses a component carrier in order to be transmitted.

DETAILED DESCRIPTION OF THE INVENTION

Technical Objects

An object of the present invention is to provide a method for transmitting a sounding reference signal in an uplink CoMP communication system, and an apparatus for the same.

The technical objects of the present invention will not be limited only to the objects described above. Accordingly, additional technical objects of the present application will be set forth in part in the description which follows and in part will become apparent to those having ordinary skill in the art upon examination of the following or may be learned from practice of the present application.

Technical Solutions

In an aspect of the present invention, a method for transmitting a sounding reference signal of a user equipment in an uplink CoMP (Cooperative Multi-Point) system includes the steps of receiving parameters for transmitting a sounding reference signal from a serving base station included in a CoMP set; allocating a resource for the sounding reference signal based upon the parameters; and transmitting the sounding reference signal to the service base station included in the CoMP set and to at least one or more neighboring base stations in accordance with the allocated resource, wherein, among the parameters, a basis sequence for the sounding reference signal may be differently determined for each base station included in the CoMP set.

Herein, the step of transmitting the sounding reference signal may either include transmitting the sounding reference signal at different time units for each base station included in the CoMP set, or may include simultaneously transmitting the sounding reference signal at different frequency bands for each base station included in the CoMP set.

In another aspect of the present invention, a user equipment of an uplink CoMP (Cooperative Multi-Point) system includes a reception module configured to receive parameters for transmitting a sounding reference signal from a serving base station included in a CoMP set; a processor configured to allocate a resource for the sounding reference signal based upon the parameters; and a transmission module configured to transmit the sounding reference signal to the service base station included in the CoMP set and to at least one or more neighboring base stations in accordance with the allocated resource, wherein, among the parameters, a basis sequence for the sounding reference signal may be differently determined for each base station included in the CoMP set.

Herein, the processor may either differently allocate time units in order to transmit the sounding reference signal for each base station included in the CoMP set, or may differently allocate frequency bands in order to simultaneously transmit the sounding reference signal for each base station included in the CoMP set.

Preferably, among the parameters, a transmission timing of the sounding reference signal for a specific base station included in the CoMP set may be delayed based upon a reception timing of the specific base station. Herein, when a contention occurs between the transmission timing of the sounding reference signal for the specific base station included in the CoMP set and a physical channel transmission for another base station, at least one or more transmission symbols for transmitting the physical channel transmission for the other base station may be dropped.

Advantageous Effects

According to the embodiments of the present invention, in an uplink CoMP communication system, a user equipment may efficiently transmit a sounding reference signal to base stations included in a CoMP set.

Additional effects of the present application will be set forth in part in the description which follows and in part will become apparent to those having ordinary skill in the art upon examination of the following or may be learned from practice of the present application.

BEST MODE FOR CARRYING OUT THE PRESENT INVENTION

Hereinafter, reference will now be made in detail to the preferred embodiments of the present invention, examples of which are illustrated in the accompanying drawings. The detailed description of the present invention is provided to facilitate the understanding of the configuration, operation, and other characteristics of the present invention. The following embodiments of the present invention correspond to examples wherein the technical features of the present invention are applied in the 3GPP system.

Figure 1:
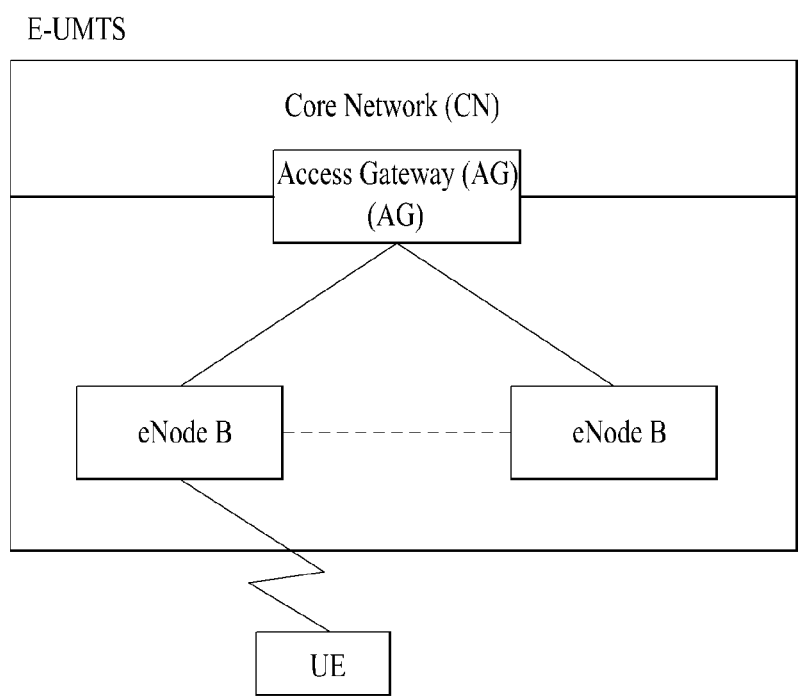
FIG. 1 illustrates a general view of an E-UMTS network structure as an example of a communication system.
Figure 2:
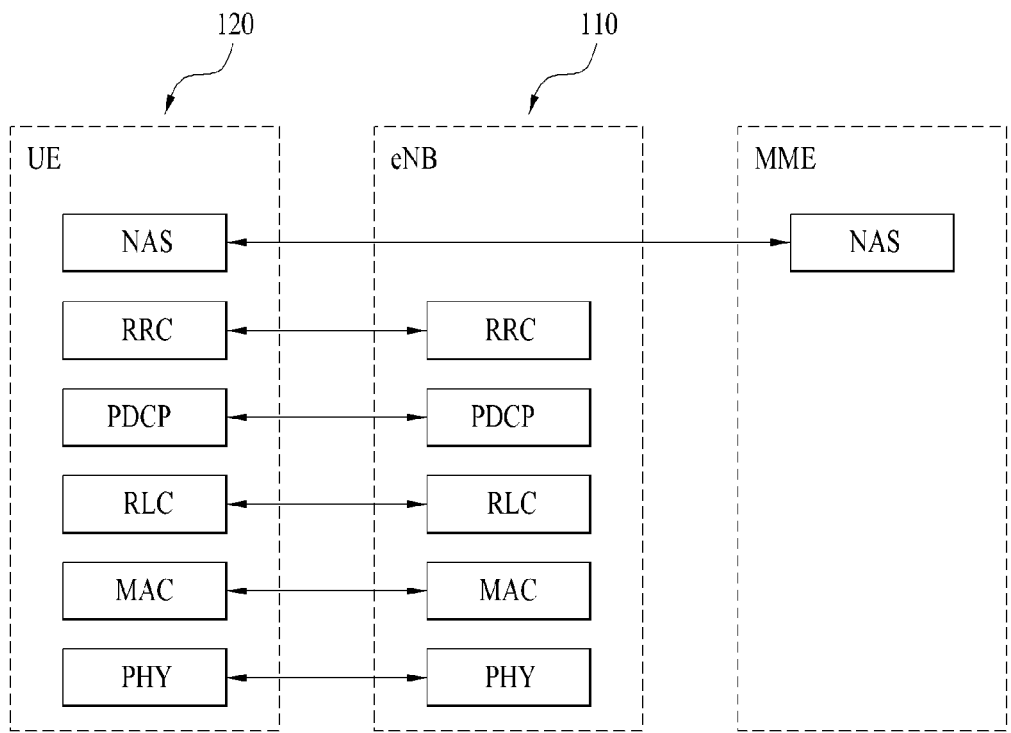
FIG. 2 illustrates a Control Plane structure and a User Plane structure of a Radio Interface Protocol between a user equipment and the E-UTRAN based upon the 3GPP radio access network standard.
Figure 2:
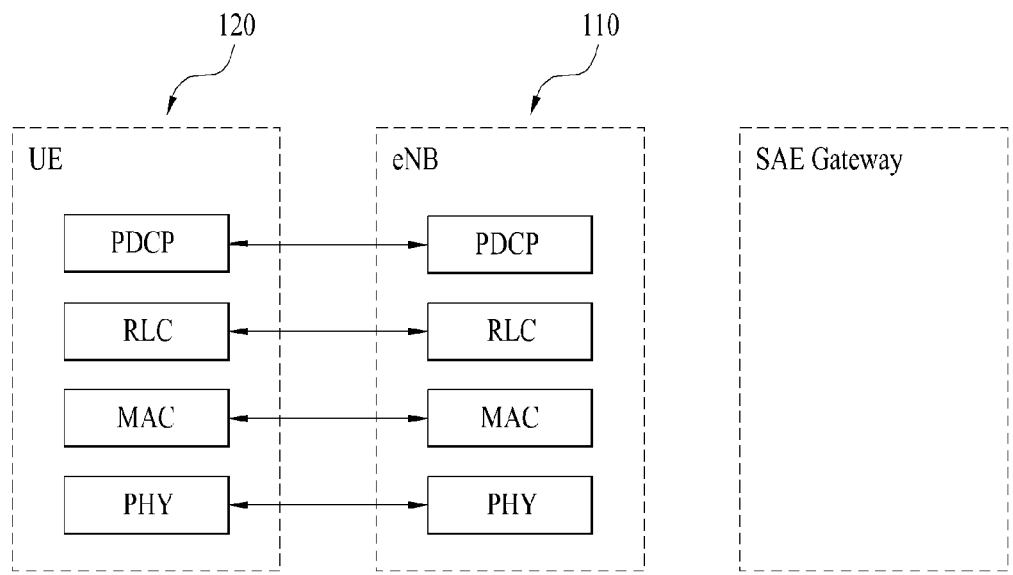

FIG. 2 illustrates a Control Plane structure and a User Plane structure of a Radio Interface Protocol between a user equipment and the E-UTRAN based upon the 3GPP radio access network standard. A control plane refers to a path through which control messages are transmitted. Herein, the control messages are used by the User Equipment (UE) and network in order to manage a unit. And, a user plane refers to a path through which data generated from an application layer are transmitted. Such data may include audio data or Internet packet data, and so on.

A first layer, which corresponds to a physical layer, uses a physical channel to provide an Information Transfer Service to a higher layer. The physical layer is connected to a Medium Access Control layer, which corresponds to a higher layer, through a Transport Channel. And, herein, data is transported between the Medium Access Control layer and the physical layer through the Transport Channel. In a data transmission between a physical layer of the transmitting end and a physical layer of the receiving end, data are transported between the physical layers through a physical channel. Herein, the physical layer uses time and frequency as radio resource. More specifically, in a downlink, the physical channel is modulated by using an OFDMA (Orthogonal Frequency Division Multiple Access) scheme, and, in an uplink, the physical channel is modulated by using an SC-FDMA (Single Carrier Frequency Division Multiple Access) scheme.

A Medium Access Control (MAC) layer of a second layer provides services to a Radio Link Control (RLC) layer, which corresponds to higher layer, through a logical channel. The Radio Link Control (RLC) layer of the second layer supports the transmission of reliable data. The function of the RLC layer may also be realized by a functional block within the MAC. A PDCP (Packet Data Convergence Protocol) layer of the second layer performs a header compression function, which can reduce unnecessary control information in order to efficiently transmit IP packets, such as IPv4 or IPv6, in a wireless (or radio) interface having a narrow bandwidth.

A radio resource control (RRC) layer which is positioned in a lowermost portion of a third layer is defined only in the control plane. And, in relation with the configuration, re-configuration, and release of radio bearers (RBs), the RRC layer performs the role of controlling the logical channels, the transmission channels, and the physical channels. The Radio Bearer refers to a service that is provided by the second layer in order to deliver (or transport) data between the UE and the network. In order to do so, the RRC layers of the UE and the network exchanges RRC messages to and from one another. If an RRC connection exists between the RRC layer of the UE and the RRC layer of the network, the user equipment is in an RRC Connected Mode. And, if not, the user equipment is in an RRC Idle Mode. An NAS (Non-Access Stratum) layer, which is located above the RRC layer performs the roles of Session Management and Mobility Management.

One cell that configures a base station (eNB) is set to one of bandwidths of 1.25, 2.5, 5, 10, and 20 Mhz, thereby providing a downlink or uplink transport service to several user equipments. Different cells may be set to provide different bandwidths.

In the network, downlink transmission channels that transmit data to the UE include a BCH (Broadcast Channel), which transmits system information, a PCH (Paging Channel), which transmits paging messages, and a downlink SCH (Shared Channel), which transmits information other than the system information, such as user traffic or control messages. In case of traffic information or control messages of a downlink multicast or broadcast service, the corresponding data may be transmitted through a downlink SCH or may also be transmitted through a separate downlink MCH (Multicast Channel). Meanwhile, uplink transmission channels that transmit data from the UE to the network include a RACH (Random Access Channel), which transmits initial control messages, and an uplink SCH (Shared Channel), which transmits information other than the system information, such as user traffic or control messages. Logical Channels being in a level higher than the transmission channel and being mapped to the transmission channel include a BCCH (Broadcast Channel), a PCCH (Paging Control Channel), a CCCH (Common Control Channel), an MCCH (Multicast Control Channel), an MTCH (Multicast Traffic Channel), and so on.

Figure 3:
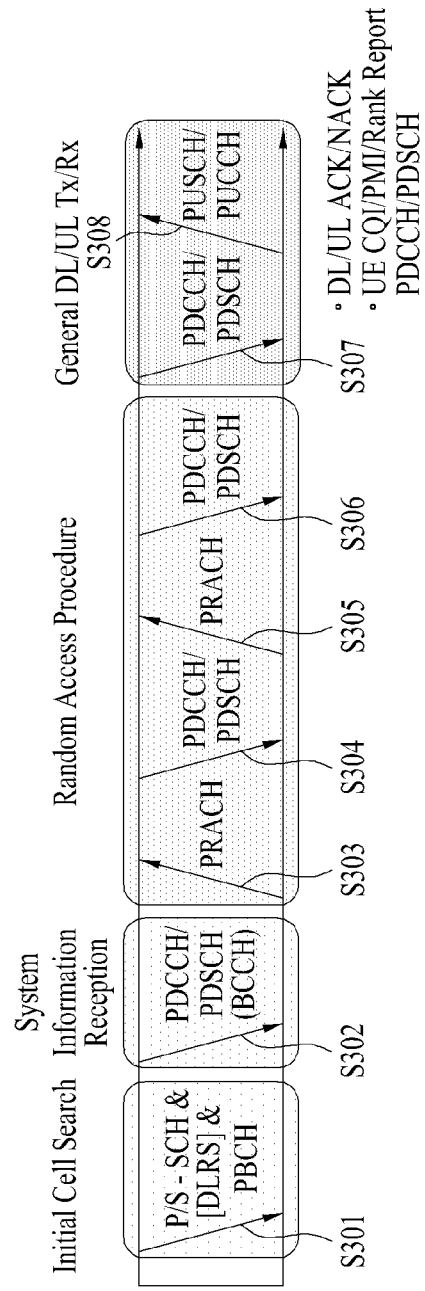
FIG. 3 illustrates physical channels that are used in the 3GPP system and a general method for transmitting signals using such physical channels.

FIG. 3 illustrates physical channels that are used in the 3GPP system and a general method for transmitting signals using such physical channels.

The user equipment performs initial cell search such as synchronization with the base station, when it newly enters a cell or when the power is turned on (S301). In order to do so, the user equipment synchronizes with the base station by receiving a Primary Synchronization Channel (P-SCH) and a Secondary Synchronization Channel (S-SCH) from the base station, and then acquires information such as cell ID, and so on. Thereafter, the user equipment may acquire broadcast information within the cell by receiving a Physical Broadcast Channel from the base station. Meanwhile, in the step of initial cell search, the user equipment may receive a Downlink Reference Signal (DL RS) so as to verify the downlink channel status.

Once the user equipment has completed the initial cell search, the corresponding user equipment may acquire more detailed system information by receiving a Physical Downlink Control Channel (PDCCH) and a Physical Downlink Control Channel (PDSCH) based upon the respective information carried in the PDCCH (S302).

Meanwhile, if the user equipment initially accesses the base station, or if there are no radio resources for signal transmission, the user equipment may perform a Random Access Procedure (RACH) with respect to the base station (S303 to S306). In order to do so, the user equipment may transmit a specific sequence to a preamble through a Physical Random Access Channel (PRACH) (S303 and S305), and may receive a response message respective to the preamble through the PDCCH and the PDSCH corresponding to the PDCCH (S304 and S306). In case of a contention based RACH, a Contention Resolution Procedure may be additionally performed.

After performing the above-described process steps, the user equipment may perform PDCCH/PDSCH reception (S307) and Physical Uplink Shared Channel (PUSCH)/Physical Uplink Control Channel (PUCCH) transmission (S308), as general uplink/downlink signal transmission procedures. The control information, which is transmitted by the user equipment to the base station or received by the user equipment from the base station via uplink, includes downlink/uplink ACK/NACK signals, a CQI (Channel Quality Indicator), a PMI (Precoding Matrix Index), an RI (Rank Indicator), and so on. In case of the 3GPP LTE system, the user equipment may transmit control information, such as the above-described CQI/PMI/RI through the PUSCH and/or the PUCCH.

Figure 4:
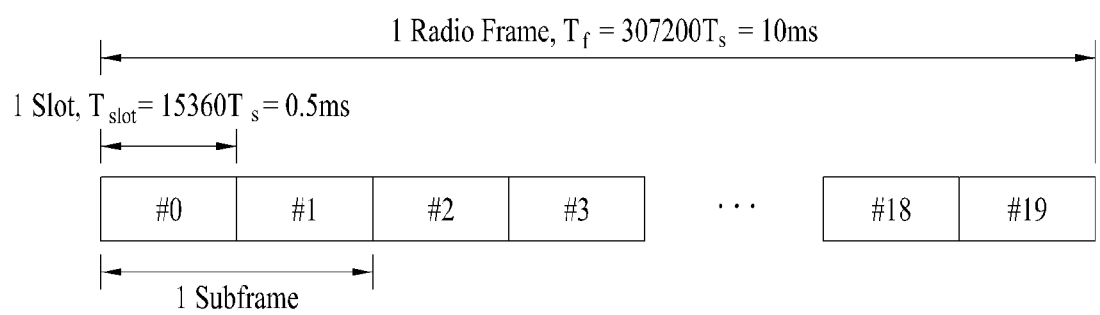
FIG. 4 illustrates an exemplary structure of a radio frame that is used in the LTE system.

FIG. 4 illustrates an exemplary structure of a radio frame that is used in the LTE system.

Referring to FIG. 4, a radio frame has the length of 10 ms ($327200 \cdot T_S$) and is configured of 10 subframes each having the same size. Each subframe has the length of 1 ms and is configured of 2 slots. Each slot has the length of 0.5 ms ($15360 \cdot T_S$). Herein, $T_S$ represents a sampling time and is indicated as $T_S=1/(15 \text{ kHz} \times 2048)=3.2552 \times 10^{-8}$ (approximately 33 ns). A slot includes a plurality of OFDM symbols in the time domain and includes a plurality of Resource Blocks (RBs) in the frequency domain. In the LTE system, one resource block includes 12 subcarriers×7(6) OFDM symbols. A TTI (Transmission Time Interval), which corresponds to a unit time during which data are transmitted, may be decided as one or more subframe units. Herein, the above-described radio frame structure is merely exemplary. And, therefore, the number of subframes included in a radio frame, or the number of slots included in a subframe, or the number of OFDM symbols included in a slot may be diversely varied.

Figure 5:
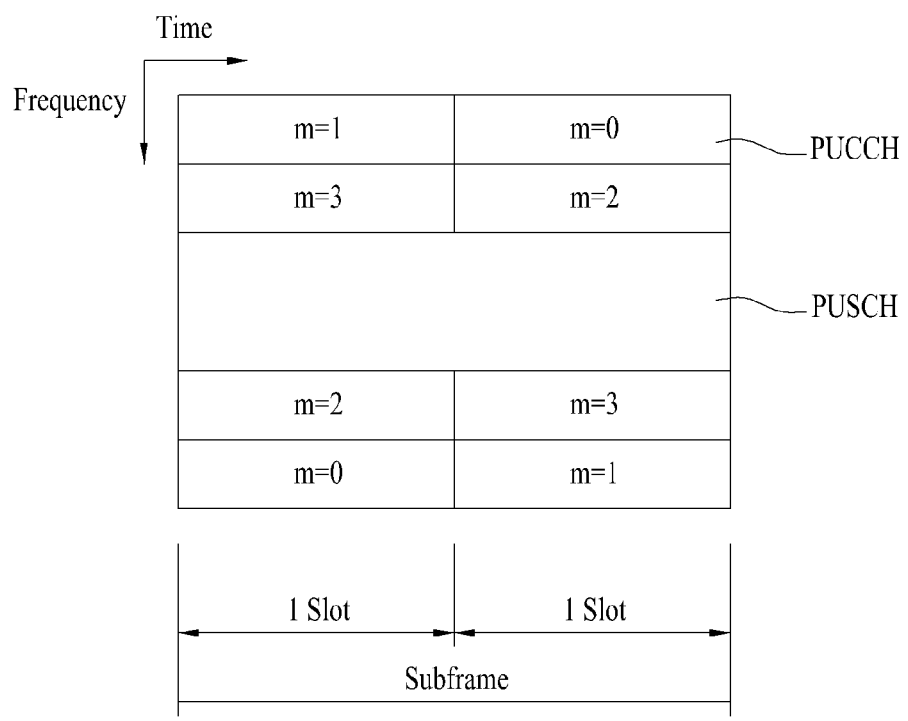
FIG. 5 illustrates an exemplary structure of an uplink radio frame that is used in the LTE system.

FIG. 5 illustrates an exemplary structure of an uplink radio frame that is used in the LTE system.

Referring to FIG. 5, an uplink subframe includes multiple slots (e.g., two (2) slots). Each slot may include different numbers of SC-FDMA symbols depending upon a CP length. For example, in case of a normal CP, a slot may include seven (7) SC-FDMA symbols. The uplink subframe is divided into a data region and a control region. The data region includes a PUSCH and is used for transmitting data signals, such as voice, and so on. The control region includes a PUCCH and is used for transmitting control information. The PUCCH includes an RB pair (e.g., m=0, 1, 2, 3) located at each end portion of the data region in a frequency axis and hops at a slot boundary. The control information includes ACK/NACK, CQI, PMI, RI, and so on.

Figure 6:
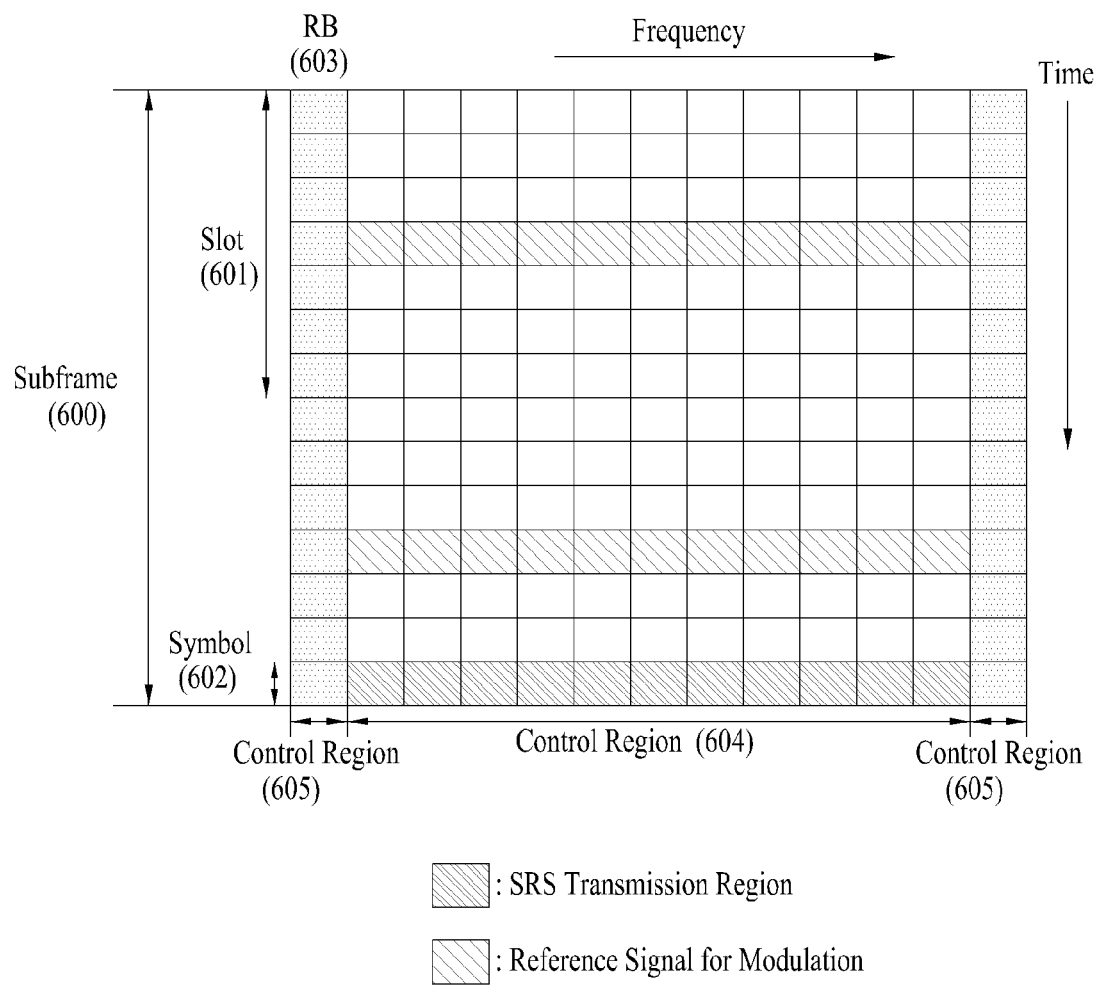
FIG. 6 illustrates another exemplary structure of an uplink radio frame that is used in the LTE system.

FIG. 6 illustrates another exemplary structure of an uplink radio frame that is used in the LTE system.

Referring to FIG. 6, a subframe (600) having the length of 1 ms, which is the basic unit in LTE uplink transmission, is configured of two 0.5 ms slots (601). When assuming the length of a Normal Cyclic Prefix (CP), each slot is configured of seven (7) symbols (602), and each symbol corresponds to an SC-FDMA symbol. A Resource Block (603) refers to a resource allocation unit, which corresponds to 12 subcarriers in a frequency domain and one slot in a time domain. The structure of an uplink subframe in an LTE system is broadly divided into a data region (604) and a control region (605). Herein, the data region refers to a series of communication resources that are used for transmitting data, such as voice, packets, and so on, which are to be transmitted to each user equipment. And, the data region corresponds to the remaining resources excluding the control region within the corresponding subframe. The control region refers to a series of communication resources that are used for transmitting reception ACK/NACK respective to a downlink signal, uplink scheduling requests, and so on.

In the example shown in FIG. 6, a region (606) to which a sounding reference signal may be transmitted corresponds to a section including an SC-FDMA symbol, which is located at an end portion of the time axis, and, within the frequency axis, the corresponding region is transmitted through a data transmission band. Sounding reference signals respective to multiple user equipments that are being transmitted to the last SC-FDMA of the same subframe may be differentiated from one another depending upon the frequency position.

Also, the sounding reference signal corresponds to a CAZAC sequence (Constant Amplitude Zero Auto Correlation sequence) $r^{SRS}(n) = r_{u,v}^{(\alpha)}(n)$, wherein a cyclic shift value ($\alpha$) is applied to a Basis Sequence $\bar{r}_{u,v}(n)$. At this point, the sounding reference signals that were transmitted from multiple user equipments, may be differentiated from one another based upon the different cyclic shift values ($\alpha$) according to Equation 1 shown below.

$$\alpha = 2\pi \frac{n_{SRS}^{cs}}{8} \quad \langle \text{Equation 1} \rangle$$

Herein, $n_{SRS}^{cs}$ indicates a value that is determined for each user equipment by a higher (or upper) layer, and the value of $n_{SRS}^{cs}$ is an integer ranging from 0 to 7. Therefore, the cyclic shift may have 8 different values depending upon the $n_{SRS}^{cs}$.

Each of the multiple CAZAC sequences, which are generated by diverse cyclic shifts from a single CAZAC sequence, has the characteristics of having a zero-correlation value with other sequences having a cyclic shift value different from that of the corresponding CAZAC sequence. Accordingly, by using such characteristics, sounding reference signals belonging to the same frequency domain may be differentiated from one another based upon the CAZAC sequence cyclic shift value. The sounding reference signal of each user equipment is allocated to the frequency based upon the parameters determined by the base station. The user equipment performs frequency hopping of the sounding reference signal so that the sounding reference signal can be transmitted to the entire uplink data transmission bandwidth.

Hereinafter, a method for mapping physical resources in order to transmit the sounding reference signal in the LTE system will now be described in detail.

First of all, in order to satisfy the transmission power $P_{SRS}$ of the user equipment, the sounding reference signal sequence $r^{SRS}(n)$ is multiplied by an amplitude scaling factor $\beta_{SRS}$, which is then mapped to a Resource Element (RE) having an index of (k,l) starting from $r^{SRS}(0)$, by using Equation 2 shown below.

$$a_{2k+k_0,l} = \begin{cases} \beta_{SRS} r^{SRS}(k) & k = 0, 1, \ldots, M_{sc,b}^{RS} - 1 \\ 0 & \text{otherwise} \end{cases} \quad \langle \text{Equation 2} \rangle$$

Herein, $k_0$ refers to a frequency region starting point of the sounding reference signal, and may be defined by using Equation 3 shown below.

$$k_0 = k'_0 + \sum_{b=0}^{B_{SRS}} 2M_{sc,b}^{RS} n_b \quad \langle \text{Equation 3} \rangle$$

However, $n_b$ indicates a frequency position index. Moreover, $k'_0$ for a general uplink subframe may be defined by using Equation 4 shown below, and $k'_0$ for an uplink pilot time slot (UpPTS) may be defined by using Equation 5 shown below.

$$k'_0 = (\lfloor N_{RB}^{UL}/2 \rfloor - m_{SRS,0}/2) N_{SC}^{RB} + k_{TC} \quad \langle \text{Equation 4} \rangle$$

$$k'_0 = \begin{cases} (N_{RB}^{UL} - m_{SRS,0}^{max}) & \text{if}((n_f \bmod 2) \times (2 - N_{SP}) + \\ N_{sc}^{RB} + k_{TC} & n_{hf}) \bmod 2 = 0 \\ k_{TC} & \text{otherwise} \end{cases} \quad \langle \text{Equation 5} \rangle$$

In Equation 4 and Equation 5, $k_{TC}$ refers to a transmission-Comb parameter, which is signaled to the user equipment through a higher (or upper) layer, and which has a value of 0 or 1. Also, in an uplink pilot time slot of a first half frame, $n_{hf}$ is equal to 0, and, in an uplink pilot time slot of a second half frame, $n_{hf}$ is also equal to 0. $M_{sc,b}^{RS}$ indicates the length of a sounding reference signal expressed in subcarrier units, i.e., bandwidth, which is defined by using Equation 6 shown below.

$$M_{sc,b}^{RS} = m_{SRS,b} N_{sc}^{RB}/2 \quad <\text{Equation 6}>$$

In Equation 6, $m_{SRS,b}$ represents a value that is signaled from the base station in accordance with an uplink bandwidth $N_{RB}^{UL}$. In order to obtain the $m_{SRS,b}$ value, a cell specific parameter $C_{SRS}$ having an integer value ranging from 0 to 7 and a user equipment specific parameter $B_{SRS}$ having an integer value ranging from 0 to 3 are required. Such $C_{SRS}$ and $B_{SRS}$ values are given by a higher-level layer.

As described above, in order to transmit a sounding reference signal to the entire uplink data transmission bandwidth, the user equipment may perform frequency hopping of the sounding reference signal, and such frequency hopping may be determined by a parameter $b_{hop}$ having a value ranging from 0 to 3, which is given by a higher-level layer.

When the frequency hopping of the sounding reference signal is inactive, i.e., when $b_{hop} \geq B_{SRS}$, the frequency position index $n_b$ may have a constant value as shown in Equation 7. Herein, $n_{RRC}$ indicates a parameter given by a higher-level layer.

$$n_b = \lfloor 4n_{RRC}/m_{SRS,b} \rfloor \bmod N_b \quad <\text{Equation 7}>$$

Meanwhile, when the frequency hopping of the sounding reference signal is active, i.e., when $b_{hop}<B_{SRS}$, the frequency position index $n_b$ may be defined by Equation 8 and Equation 9 shown below.

$$n_b = \begin{cases} \left\lfloor \dfrac{4n_{RRC}}{m_{SRS,b}} \right\rfloor \mod N_b & b \leq b_{hop} \\ \left\{ F_b(n_{SRS}) + \left\lfloor \dfrac{4n_{RRC}}{m_{SRS,b}} \right\rfloor \right\} \mod N_b & \text{otherwise} \end{cases} \quad \langle\text{Equation 8}\rangle$$

$$F_b(n_{SRS}) = \begin{cases} (N_b/2) \left\lfloor \dfrac{n_{SRS} \mod \prod_{b'=b_{hop}}^{b} N_{b'}}{\prod_{b'=b_{hop}}^{b-1} N_{b'}} \right\rfloor + \left\lfloor \dfrac{n_{SRS} \mod \prod_{b'=b_{hop}}^{b} N_{b'}}{2 \prod_{b'=b_{hop}}^{b-1} N_{b'}} \right\rfloor & \text{if } N_b \text{ even} \\ \left\lfloor \dfrac{N_b}{2} \right\rfloor \left\lfloor \dfrac{n_{SRS}}{\prod_{b'=b_{hop}}^{b-1} N_{b'}} \right\rfloor & \text{if } N_b \text{ odd} \end{cases} \quad \langle\text{Equation 9}\rangle$$

Herein, $n_{SRS}$ indicates a parameter for calculating a number of sounding reference signal transmissions, which is calculated by using Equation 10 shown below.

$$n_{SRS} = \begin{cases} \left\lfloor \dfrac{2N_{SP}n_f + 2(N_{SP}-1)\left\lfloor \dfrac{n_s}{10} \right\rfloor + \left\lfloor \dfrac{T_{offset}}{T_{offset\_max}} \right\rfloor}{} \right\rfloor, & \text{for 2 ms SRS periodicity of TDD frame structure} \\ \left\lfloor \dfrac{\left(n_f \times 10 + \left\lfloor \dfrac{n_s}{2} \right\rfloor\right)}{T_{SRS}} \right\rfloor, & \text{otherwise} \end{cases} \quad \langle\text{Equation 10}\rangle$$

In Equation 10, $T_{SRS}$ represents a cycle period of the sounding reference signal, and $T_{offset}$ indicates a subframe offset of the sounding reference signal. Also, $n_s$ indicates the slot number, and $n_f$ indicates the frame number.

First of all, with the evolution in the communication systems, a broader coverage and more enhanced service quality is being required. And, in order to meet with such demands, a CoMP (Cooperative Multi-Point) transmission system is recently being proposed. In a CoMP transmission system, multiple cells are grouped into a CoMP set in order to enhance the performance of the user equipment. Then, a signal may be cooperatively transmitted to the user equipment, or a signal may be cooperatively received from the user equipment. Meanwhile, in an uplink CoMP transmission system, a Fast Cell Switching (FCS) scheme and a JP (Joint Reception) scheme exist. Hereinafter, each of the above-mentioned will be described in detail.

Figure 7:
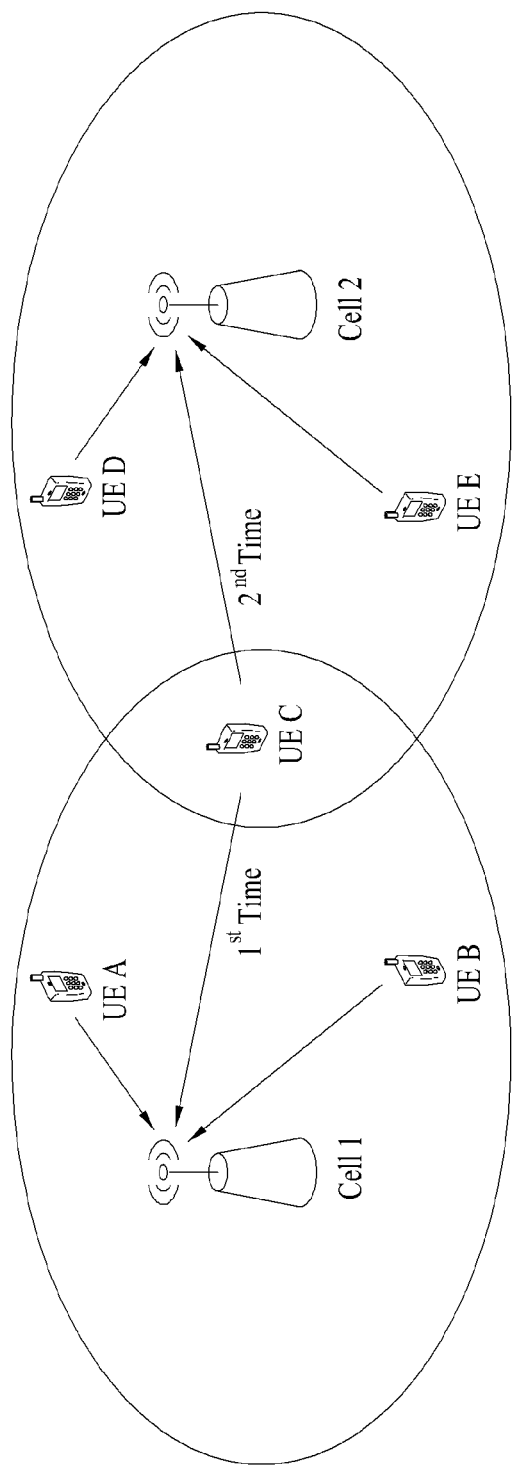
FIG. 7 illustrates an example of a Fast Cell Switching (FCS) scheme in an uplink CoMP transmission system.

FIG. 7 illustrates an example of a Fast Cell Switching (FCS) scheme in an uplink CoMP transmission system.

Referring to FIG. 7, a user equipment or network may swiftly select and change a base station (eNB), which seeks to receive data from the user equipment, from the CoMP set. Accordingly, a data transmission of the user equipment may be received by a base station having the optimal reception environment. More specifically, at a $1^{st}$ time, although Cell 1 is receiving data transmitted from User Equipment (UE) C, depending upon the wireless communication environment, at a $2^{nd}$ time, Cell 2, which is more advantageous, may receive the data being transmitted from UE C. Since the user equipment and network are already aware (or capable of recognizing) of the base stations included in the CoMP set, the cell receiving data from the UE C may be swiftly changed.

Figure 8:
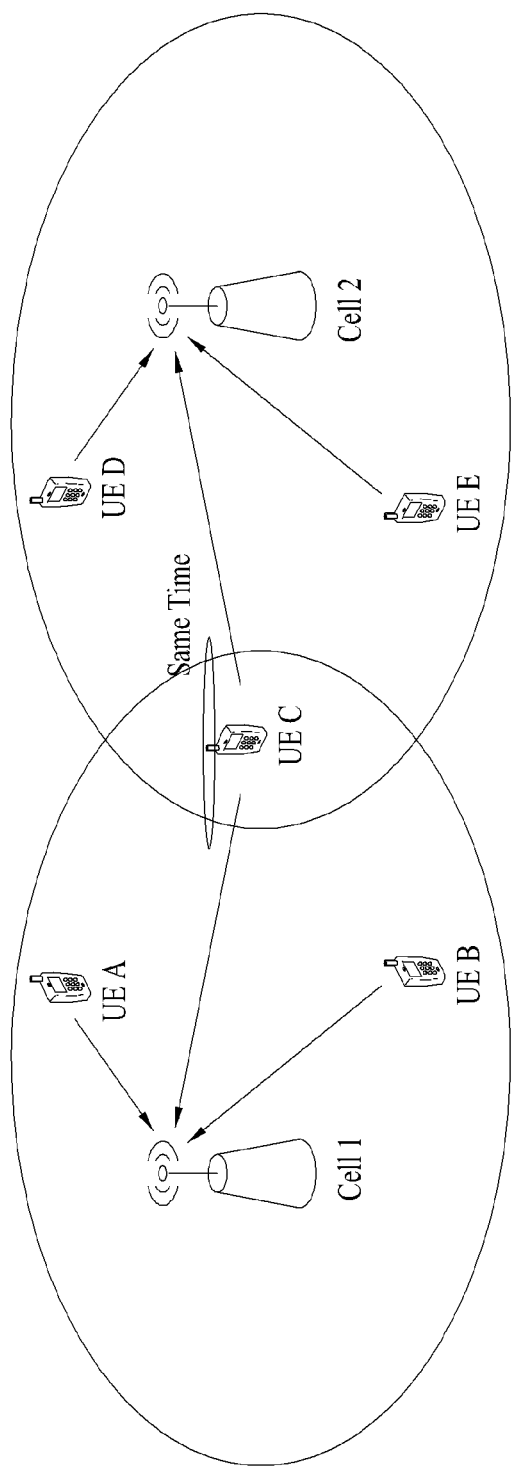
FIG. 8 illustrates an example of a JR (Joint Reception) scheme in an uplink CoMP transmission system.

FIG. 8 illustrates an example of a JP (Joint Reception) scheme in an uplink CoMP transmission system.

Referring to FIG. 8, Cell 1 and Cell 2 may simultaneously receive the data of UE C. And, the network may either combine such received data or may select data having more excellent quality, thereby enhancing the uplink signal receiving performance.

In both of the above-described Fast Cell Switching (FCS) scheme and a JR scheme, the base stations included in the CoMP set should measure the uplink channel quality of the user equipment through the sounding reference signal transmitted from the user equipment. In case the user equipment transmits the sounding reference signal by using the basis sequence corresponding to a specific cell, another cell included in the CoMP set, which has received the sounding reference signal, cannot measure the uplink channel of the user equipment. This will be described in more detail with reference to the accompanying drawing.

Figure 9:
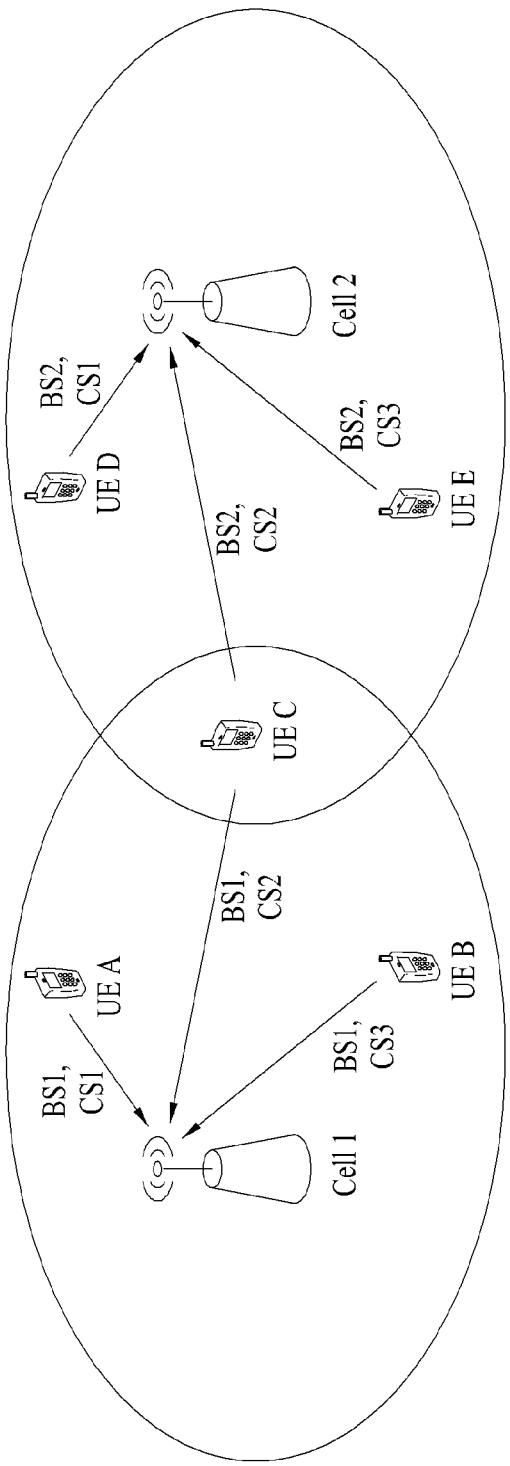
FIG. 9 illustrates exemplary disadvantages that may occur when a sounding reference signal is transmitted in an uplink CoMP transmission system.

FIG. 9 illustrates exemplary disadvantages that may occur when a sounding reference signal is transmitted in an uplink CoMP transmission system.

Referring to FIG. 9, sounding reference signals transmitted from the multiple user equipments included in Cell 1 may be differentiated from one another by using different cyclic shift values based upon the first basis sequence. Conversely, sounding reference signals transmitted from the multiple user equipments included in Cell 2 may be differentiated from one another by using different cyclic shift values based upon the second basis sequence. In this case, when UE C transmits the sounding reference signal based upon the first basis sequence and the second cyclic shift, due to the sounding reference signals received from other user equipments included in Cell 2, Cell 2 cannot properly receive the sounding reference signal transmitted from UE C. More specifically, this is because the sounding reference signals transmitted from UE D and UE E are generated based upon the second basis sequence and also because such sounding reference signals cannot maintain orthogonality with the sounding reference signal transmitted from UE C.

In order to resolve such problems, when the user equipment transmits a sounding reference signals to cells included in a CoMP set, the present invention proposes a method used by the user equipment for generating and transmitting sounding reference signals based upon different basis sequences by differentiating the sounding reference signals from one another in time units, frequency band units, or in a combination of time units and frequency band units. This will be described in more detail with reference to the accompanying drawing.

Figure 10:
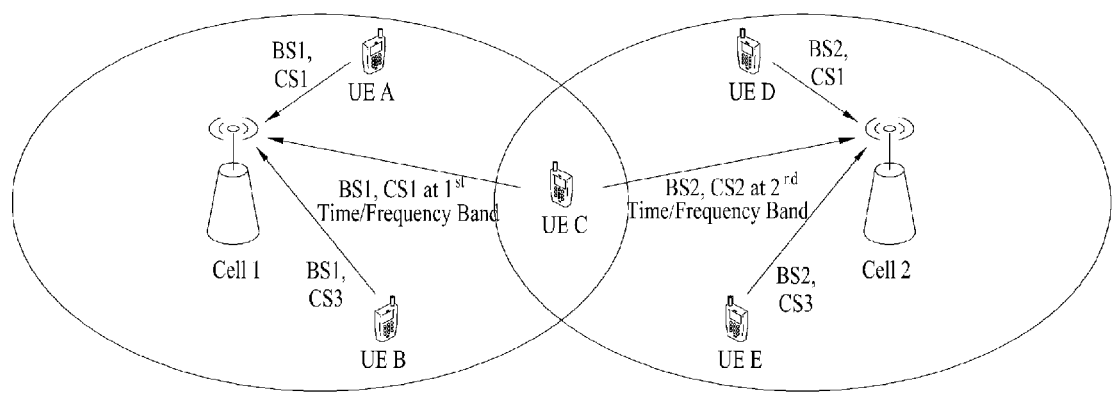
FIG. 10 illustrates an example of transmitting a sounding reference signal in an uplink CoMP transmission system according to an exemplary embodiment of the present invention.

FIG. 10 illustrates an example of transmitting a sounding reference signal in an uplink CoMP transmission system according to an exemplary embodiment of the present invention.

Referring to FIG. 10, in a first time unit and/or a first frequency band unit received by Cell 1, UE C uses the first basis sequence and the second cyclic shift value so as to transmit the sounding reference signal. Accordingly, the sounding reference signal transmitted from UE C may be received without any interference with the sounding reference signals transmitted from other user equipments belonging to Cell 1.

Meanwhile, in a second time unit and/or a second frequency band unit received by Cell 1, UE C uses the second basis sequence and the second cyclic shift value so as to transmit the sounding reference signal. Accordingly, the sounding reference signal transmitted from UE C may be received without any interference with the sounding reference signals transmitted from other user equipments belonging to Cell 2.

Also, in the Fast Cell Switching (FCS) scheme, it is preferable to vary (or change) the basis sequence in time units. And, in the JR scheme, it is preferable to vary (or change) the basis sequence in frequency units.

Although the above description mentions the change in the basis sequence, the present invention may also be realized by using any other resources for transmitting the sounding reference signal. For example, the user equipment may vary a transmission COM parameter is time units or frequency band units, so as to differentiate the sounding reference signals and to transmit the differentiated sounding reference signals. In this case, it is preferable for a serving cell included in the CoMP set to notify the user equipment of a parameter, which is used for transmitting the sounding reference signal, e.g., a transmission cycle period for another cell included in the CoMP, a transmission offset, a transmission COM parameter, and so on, through RRC signaling.

The above-described scheme may also be applied to a reference signal sequence, which is similar to the sounding reference signal. For example, based upon a DM-RS that is to be used by the base station for the modulation of the data received the user equipment, the user equipment may switch the basis sequence of the DM-RS in time units or frequency units and may then transmit the processed basis sequence.

Meanwhile, when synchronizing the user equipment with a sounding reference signal transmission timing to Cell 1, which belongs to the CoMP set, the sounding reference signal reception timing of another cell included in the CoMP set, which receives sounding reference signals from the user equipment, may be largely different from the reception timing of a sounding reference signal, which is received from another user equipment belonging to the other cell. This is because of a propagation delay existing among a plurality of cells each different from one another.

Figure 11:
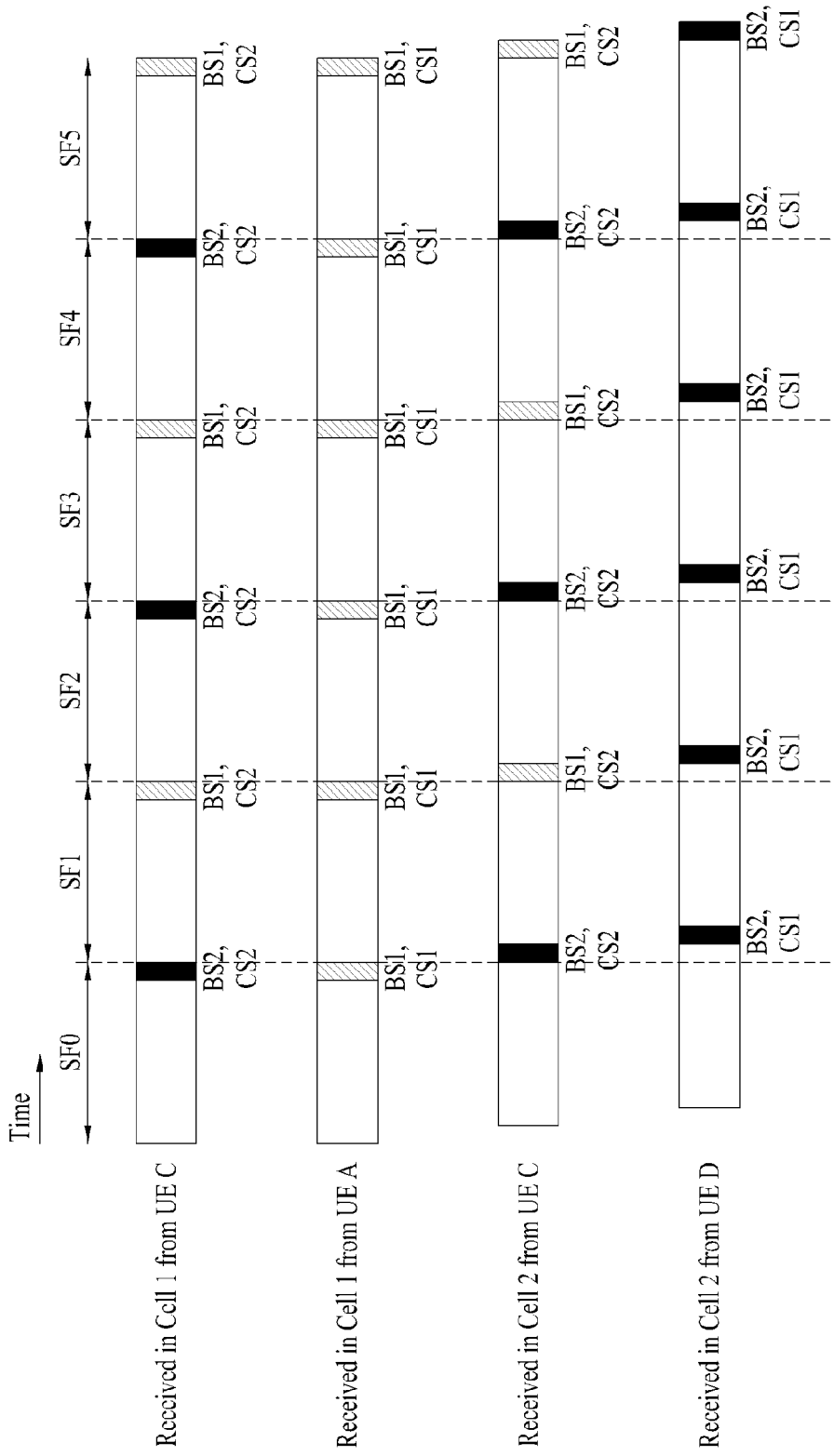
FIG. 11 illustrates exemplary disadvantages of a reception timing for the sounding reference signal in the uplink CoMP transmission system.

FIG. 11 illustrates exemplary disadvantages of a reception timing for the sounding reference signal in the uplink CoMP transmission system. Most particularly, in FIG. 11, it is assumed that, in a subframe received by Cell 1, UE C uses the first basis sequence and the second cyclic shift value so as to transmit a sounding reference signal, and, in a subframe received by Cell 2, UE C uses the second basis sequence and the second cyclic shift value so as to transmit a sounding reference signal.

Referring to FIG. 11, first of all, it is assumed that UE C transmits an uplink signal including a sounding reference signal by using a timing control command received from Cell 1. In this case, Cell 1 aligns the reception timing of the uplink signal received from UE C with a reception timing of an uplink signal received from another user equipment (UE), which belongs to Cell 1. Therefore, it will be apparent that Cell 1 receives the sounding reference signal transmitted from UE C in subframe 1, subframe 3, and subframe 5, without any interference from the sounding reference signal received from another user equipment, i.e., UE A. Furthermore, Cell 1 may detect sounding reference signals from user equipments belonging to Cell 1 at an aligned reception timing.

However, the sounding reference signal transmission of UE C is not matched with the reception timing of uplink signals received from other user equipments belonging to Cell 2. Therefore, when Cell 2 receives a sounding reference signal from UE C, even if multiple user equipments belonging to Cell 2 transmit sounding reference signals by using the same basis sequence, it will be apparent that, in Cell 2, interference occurs between a sounding reference signal transmitted from UE C and a sounding reference signal received from another user equipment, i.e., UE D, in subframe 0, subframe 2, and subframe 4.

In order to resolve such problems, the present invention proposes a method of switching a sounding reference signal transmission timing of the user equipment for each cell included in the CoMP set. This will be described in more detail with reference to the accompanying drawing.

Figure 12:
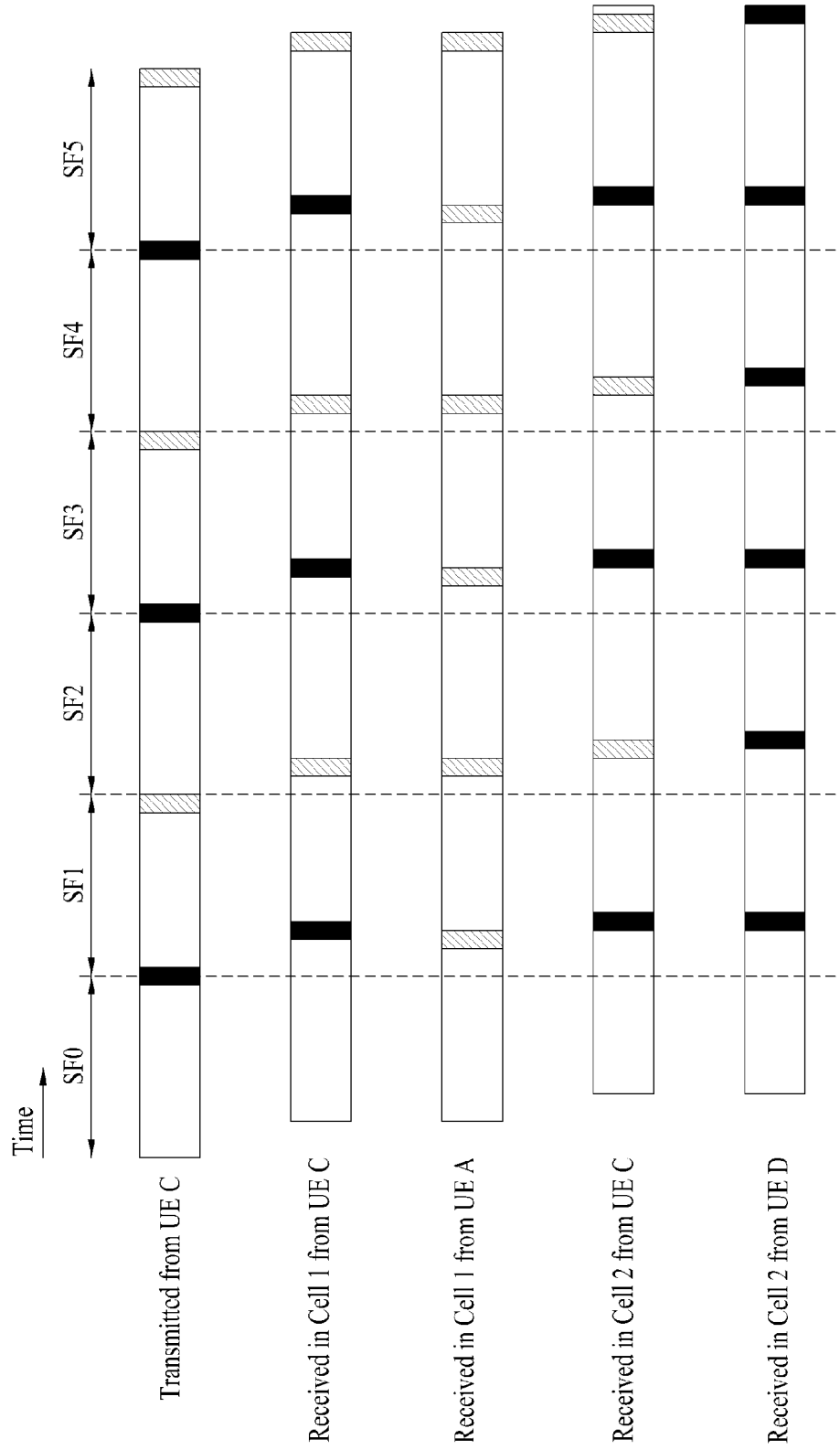
FIG. 12 illustrates an example of adjusting a reception timing for the sounding reference signal in the uplink CoMP transmission system according to an exemplary embodiment of the present invention.

FIG. 12 illustrates an example of adjusting a reception timing for the sounding reference signal in the uplink CoMP transmission system according to an exemplary embodiment of the present invention.

Referring to FIG. 12, UE C switches the sounding reference signal transmission timing based upon whether the cell receiving the uplink signal corresponds to Cell 1 or to Cell 2. Then, the reception timing of the sounding reference signal received from UE C within each cell may be aligned with the reception timing of sounding reference signals received from other user equipments belonging to each cell.

More specifically, when the reception timing of Cell 1 of the sounding reference signal, which is transmitted from UE C by using the first basis sequence and the second cyclic shift value, is aligned with the reception timing of sounding reference signals, which are received from other user equipment belonging to Cell 1, the sounding reference signal, which is transmitted from UE C by using the second basis sequence and the second cyclic shift value, may be delayed in accordance with the value signaled from Cell 2 and FIG. 11, thereby being transmitted.

In this case, the reception timing of a sounding reference signal transmitted from UE C of Cell 2 by using the second basis sequence and the second cyclic shift value may be aligned with the reception timing of a sounding reference signal transmitted from UE D of Cell 2 by using the second basis sequence and the first cyclic shift value.

In order to perform such timing switching, UE C should be aware of the uplink transmission timing for each cell. Therefore, with the exception for the serving cell, other cells belonging to the CoMP set are required to notify the timing control values for UE C to the serving cell. And, accordingly, the serving cell may signal the received timing control values to UE C. Furthermore, it is preferable to realize the control of the uplink transmission timing in symbol units.

The above-described reception timing control of each cell may also be applied to other physical channels other than the sounding reference signals. For example, in case of the Fast Cell Switching (FCS) scheme, the user equipment may switch a subframe transmission timing for the PUSCH in accordance with the reception timing of each cell receiving the transmitted subframes. More specifically, in the exemplary embodiment of the present invention, although a basis sequence switching of the sounding reference signals is applied along with the transmission timing switching, regardless of the basis sequence switching, only the transmission timing switching may be applied so as to align the uplink signal reception timing of each cell.

Meanwhile, according to the above-described method, when a user equipment operating in the CoMP mode controls the uplink signal transmission timing, a contention may occur between physical channel transmissions of a user equipment transmitted from two consecutive subframes. In this case, the present invention proposes a method of dropping, i.e., not transmitting, the entire physical channel or a portion of the physical channel being transmitted from any one of the two subframes between which the contention occurs. This will be described in more detail with reference to the accompanying drawing.

Figure 13:
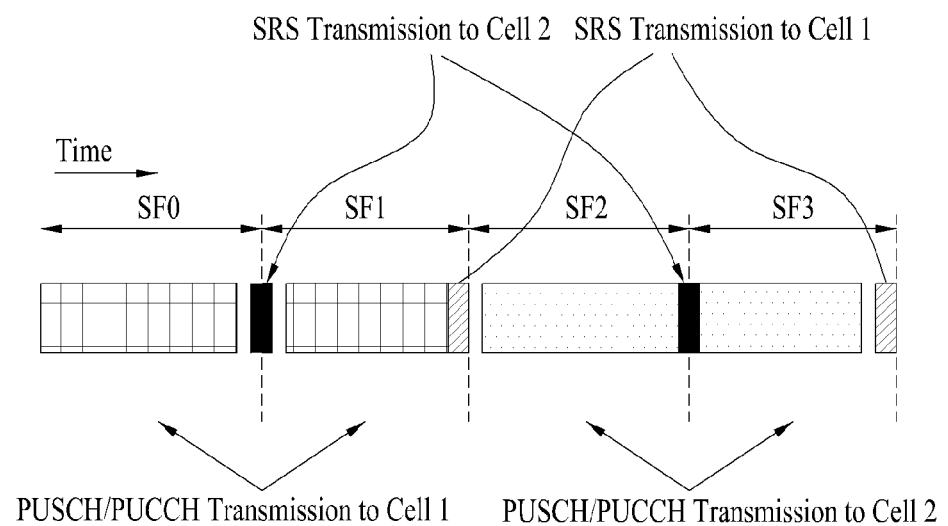
FIG. 13 illustrates an exemplary method for dropping a specific symbol when transmitting a sounding reference signal in the uplink CoMP transmission system according to an exemplary embodiment of the present invention.

FIG. 13 illustrates an exemplary method for dropping a specific symbol when transmitting a sounding reference signal in the uplink CoMP transmission system according to an exemplary embodiment of the present invention. Most particularly, FIG. 13 illustrates a case wherein a contention occurs between a physical channel, such as PUSCH or PUCCH, and a transmission symbol of the sounding reference signal.

Referring to FIG. 13, first of all, subframe 0 (SF0) and subframe 1 (SF1) transmit a physical channel, such as PUSCH or PUCCH, to Cell 1, and the last symbol of subframe 0 transmits a sounding reference signal to Cell 2. In this case, as described above, the transmission timing of the sounding reference signal to the delayed Cell 2 does not match the boundaries of the last symbol of subframe 0 and the starting symbol of subframe 1. Therefore, it will be preferable to drop both the last symbol of subframe 0 and the starting symbol of subframe 1 for transmitting the PUSCH or PUCCH to Cell 1.

Also, as shown in FIG. 13, when subframe 2 (SF2) and subframe 3 (SF3) transmit a physical channel, such as PUSCH or PUCCH, to Cell 2, and when the last symbol of subframe 3 transmits a sounding reference signal to Cell 1, the transmission timing of the sounding reference signal to Cell 1 does not match the boundary of the last symbol of subframe 3. Therefore, it will be preferable to drop both the last symbol of subframe 3 for transmitting the PUSCH or PUCCH to Cell 2.

Due to such symbol dropping, a gap may exist between the transmission of a sounding reference signal and the transmission of the PUSCH/PUCCH.

Meanwhile, as described above, the reception timing control in the base station may also be applied to other physical channels other than the sounding reference signals. In this case, a contention may also occur between the PUSCH/PUCCH each being transmitted to different cells.

Figure 14:
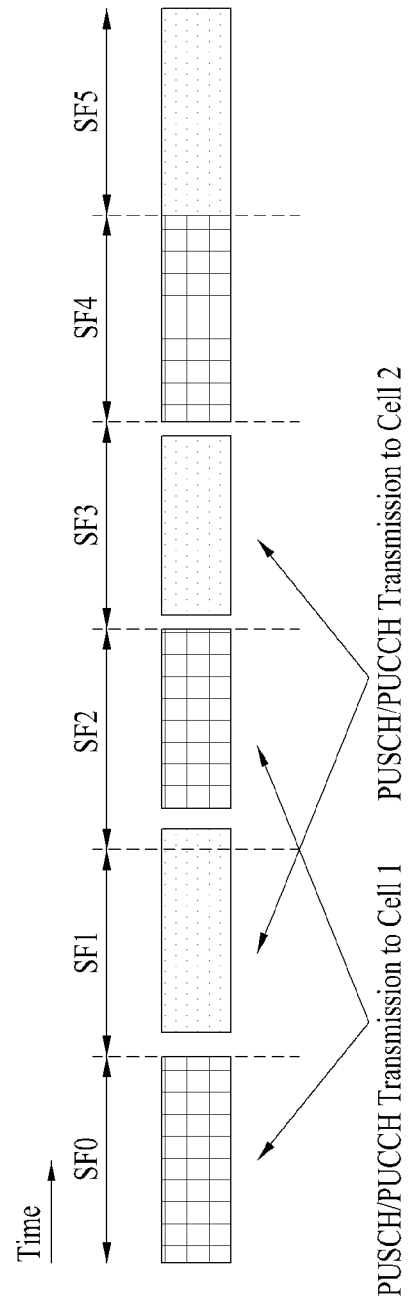
FIG. 14 illustrates an exemplary method for dropping a specific symbol when adjusting a reception timing for the sounding reference signal in the uplink CoMP transmission system according to an exemplary embodiment of the present invention.

FIG. 14 illustrates an exemplary method for dropping a specific symbol when adjusting a reception timing for the sounding reference signal in the uplink CoMP transmission system according to an exemplary embodiment of the present invention.

More specifically, a time resource of the PUSCH/PUCCH being transmitted to Cell 2 from subframe 1 (SF1) may overlap with a time resource of the PUSCH/PUCCH being transmitted to Cell 1 from subframe 2 (SF2). In this case, the starting symbol of the PUSCH/PUCCH, which is transmitted to Cell 1 from subframe 2 (SF2), may be dropped and not be transmitted. Alternatively, the last symbol of the PUSCH/PUCCH, which is transmitted to Cell 2 from subframe 1 (SF1), may be dropped and not be transmitted. Moreover, both the starting symbol and the last symbol of the PUSCH/PUCCH, which are transmitted to Cell 2 from subframe 3 (SF3), may be dropped and not be transmitted.

Hereinafter, a procedure for adding a cell for an uplink CoMP transmission will be described in detail. When the network includes a specific cell to the uplink CoMP set, an uplink synchronization procedure should be applied. In the present invention, an algorithm for configuring the uplink CoMP set will now be described in detail.

First of all, a serving cell included in the CoMP set sends a command to include a target cell, which is selected based upon a channel measurement report received from the user equipment, in the CoMP set. Along with this command, the serving cell may notify the user equipment of a parameter for a Random Access, and most particularly a Random Access preamble, to a target cell.

Subsequently, the user equipment performs a process of transmitting a random access preamble to the target cell. And, after receiving the random access preamble from the user equipment, the target cell may notify the serving cell of the information related to the uplink transmission timing for the user equipment. After receiving the corresponding information, the serving cell may signal the information related to the uplink transmission timing to the user equipment so as to perform timing alignment.

Finally, it is disclosed herein that the user equipment transmits a sounding reference signal to the cell included in the uplink CoMP set.

Meanwhile, the serving cell may signal the above-described parameter for transmitting a sounding reference signal to the target cell to the user equipment during any one of the steps of 1) transmitting a random access preamble and 2) transmitting information related to an uplink transmission timing. However, in case of step 1), when the random access procedure fails to be performed, the parameter for transmitting a sounding reference signal may become an unnecessary signaling overhead. Therefore, it will be more preferable to signal the parameter during step 2).

Figure 15:
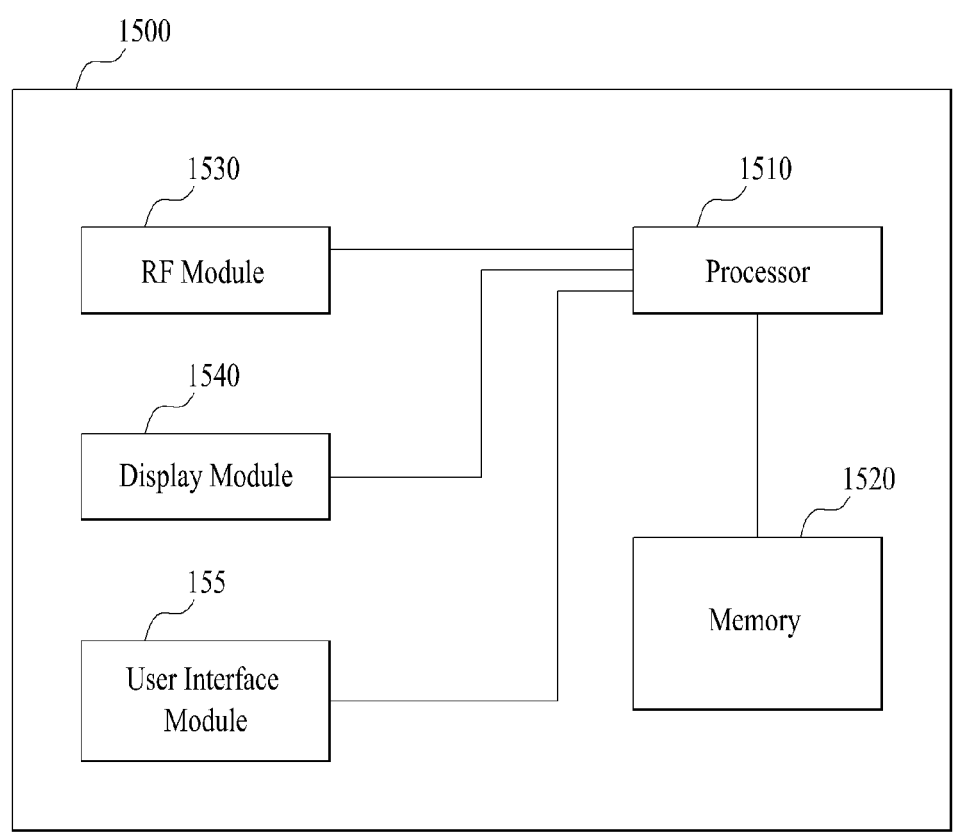
FIG. 15 illustrates a block view showing the structures of a communication receiver and a communication transmitter according to an exemplary embodiment of the present invention.

FIG. 15 illustrates a block view showing the structures of a communication transmitter/receiver according to an exemplary embodiment of the present invention. The communication transmitter/receiver may corresponds to a portion of the base station or user equipment.

Referring to FIG. 15, a communication transmitter/receiver (1500) includes a processor (1510), a memory (1520), an RF module (1530), a display module (1540), and a user interface module (1550).

The communication transmitter/receiver (1500) is an exemplary illustration provided to simplify the description of the present invention. Also, the communication transmitter/receiver (1500) may further include necessary modules. Also, in the communication transmitter/receiver (1500) some of the modules may be divided into more segmented modules. Referring to FIG. 15, an example of the processor (1510) is configured to perform operations according to the embodiment of the present invention.

More specifically, in case the communication transmitter/receiver (1500) corresponds to a portion of the base station, the processor (1510) may generate a control signal and may perform the function of mapping the control signal to a control channel configured within multiple frequency blocks. Also, in case the communication transmitter/receiver (1500) corresponds to a portion of the user equipment, the processor (1510) verifies a control channel, which it designated to the processor (1510) itself, from a signal received from the multiple frequency blocks, and the processor (1510) may then extract a control signal from the verified control channel.

Thereafter, the processor (1510) may perform the necessary operations based upon the control signal. For the detailed operations of the processor (1510), reference may be made to the description of the present invention shown in FIG. 1 to FIG. 14.

The memory (1520) is connected to the processor (1510) and stores operating systems, applications, program codes, data, and so on. The RF module (1530) is connected to the processor (1510) and performs a function of converting baseband signals to radio (or wireless) signals or converting radio signals to baseband signals. In order to do so, the RF module (1530) performs analog conversion, amplification, filtering, and frequency uplink conversion or inverse processes of the same. The display module (1540) is connected to the processor (1510) and displays diverse information. The display module (1540) will not be limited only to the example given herein. In other words, generally known elements, such as LCD (Liquid Crystal Display), LED (Light Emitting Diode), OLED (Organic Light Emitting Diode) may also be used as the display module (1540). The user interface module (1550) is connected to the processor (1510), and the user interface module (1550) may be configured of a combination of generally known user interfaces, such as keypads, touchscreens, and so on.

The above-described embodiments of the present invention correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention. Furthermore, it is apparent that claims that do not have any explicit citations within the scope of the claims of the present invention may either be combined to configure another embodiment of the present invention, or new claims may be added during the amendment of the present invention after the filing for the patent application of the present invention.

In the description of the present invention, the embodiments of the present invention have been described by mainly focusing on the data transmission and reception relation between the relay node and the base station. Occasionally, in the description of the present invention, particular operations of the present invention that are described as being performed by the base station may also be performed by an upper node of the base station. More specifically, in a network consisting of multiple network nodes including the base station, it is apparent that diverse operations that are performed in order to communicate with the terminal may be performed by the base station or b network nodes other than the base station. Herein, the term Base Station (BS) may be replaced by other terms, such as fixed station, Node B, eNode B (eNB), Access Point (AP), and so on. Additionally, the term user terminal (or user equipment) may be replaced by other terms, such as UE (User Equipment), MS (Mobile Subscriber), MSS (Mobile Subscriber Station), and so on.

The above-described embodiments of the present invention may be implemented by using a variety of methods. For example, the embodiments of the present invention may be implemented in the form of hardware, firmware, or software, or in a combination of hardware, firmware, and/or software.

In case of implementing the embodiments of the present invention in the form of hardware, the method according to the embodiments of the present invention may be implemented by using at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, micro controllers, micro processors, and so on.

In case of implementing the embodiments of the present invention in the form of firmware or software, the method according to the embodiments of the present invention may be implemented in the form of a module, procedure, or function performing the above-described functions or operations. A software code may be stored in a memory unit and driven by a processor. Herein, the memory unit may be located inside or outside of the processor, and the memory unit may transmit and receive data to and from the processor by using a wide range of methods that have already been disclosed.

The present invention may be realized in another concrete configuration (or formation) without deviating from the scope and spirit of the essential characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents. Therefore, it is intended that the present invention covers the modifications and variations of this invention provided they come within the scope of the appended claims and their equivalents, and it is not intended to limit the present invention only to the examples presented herein.

INDUSTRIAL APPLICABILITY

The present invention may be applied to a wireless communication system. And, more particularly, the present invention may be applied to a method for transmitting a sounding reference signal in an uplink CoMP communication system, and an apparatus for the same.

What is claimed is:

1. A method for transmitting a sounding reference signal of a user equipment in an uplink CoMP (Cooperative Multi-Point) system, the method for transmitting a sounding reference signal comprising:
   receiving parameters for transmitting a sounding reference signal from a serving base station included in a CoMP set, wherein the parameters include basis sequences and timing control values for at least one neighbor base station included in the CoMP set, and wherein the timing control values are set in symbol units;
   allocating a resource for the sounding reference signal based upon the parameters; and
   transmitting the sounding reference signal to the service base station and to the at least one neighbor base station in accordance with the allocated resource,
   wherein the basis sequences for the sounding reference signal are differently determined for each base station included in the CoMP set,
   wherein the sounding reference signal is transmitted at different time units, wherein the different time units are determined by applying the timing control values for at least one neighbor base station included in the CoMP set, wherein the timing control values are respectively set corresponding to reception timing of the at least one neighbor base station, and wherein the reception timing of the at least one neighbor base station is respectively aligned to a sounding reference signal reception timing related with another user equipment belonging to the at least one neighbor base station.

2. The method of claim 1, wherein, when a contention occurs between the transmission timing of the sounding reference signal for the specific base station included in the CoMP set and a physical channel transmission for another base station, at least one or more transmission symbols for transmitting the physical channel transmission for the other base station are dropped.

3. A user equipment of an uplink CoMP (Cooperative Multi-Point) system, the user equipment comprising:

a radio frequency unit; and a processor, wherein the processor is configured to:

receive parameters for transmitting a sounding reference signal from a serving base station included in a CoMP set, to allocate a resource for the sounding reference signal based upon the parameters, and to transmit the sounding reference signal to the service base station and to at least one neighbor base station in accordance with the allocated resource, wherein the parameters includes basis sequences and timing control values for the at least one neighbor base station included in the CoMP set, and wherein the timing control values are set in symbol units, wherein the basis sequences for the sounding reference signal are differently determined for each base station included in the CoMP set, wherein the sounding reference signal is transmitted at different time units, wherein the different time units are determined by applying the timing control values for at least one neighbor base station included in the CoMP set, wherein the timing control values are respectively set corresponding to reception timing of the at least one neighbor base station, and wherein the reception timing of the at least one neighbor base station is respectively aligned to a sounding reference signal reception timing related with another user equipment belonging to the at least one neighbor base station.

4. The user equipment of claim 3, wherein the processor is further configured to drop at least one or more transmission symbols for transmitting the physical channel transmission for the other base station, when a contention occurs between the transmission timing of the sounding reference signal for the specific base station included in the CoMP set and a physical channel transmission for another base station, at least one or more transmission symbols for transmitting the physical channel transmission for the other base station are dropped.

* * * * *